3,246,035
PREPARATION OF NON-VICINAL AROMATIC DIAMINES

Sylvan E. Forman, Trenton, Andrew Lupichuk, Hamilton Square, and Herman Wachs, Highland Park, N.J., assignors to FMC Corporation, New York, N.Y., a corporation of Delaware
No Drawing. Filed Nov. 28, 1962, Ser. No. 240,717
4 Claims. (Cl. 260—582)

This invention relates to an improved process for removing undesirable isomers from a crude mixture of arylenediamines and, in particular, it relates to a novel process for separating 2,4- and 2,6-diaminotoluene from 2,3- and 3,4-diaminotoluene.

The arylenediamines, such as diaminotoluene, are used commercially to make diisocyanates for urethane resins by reaction with phosgene:

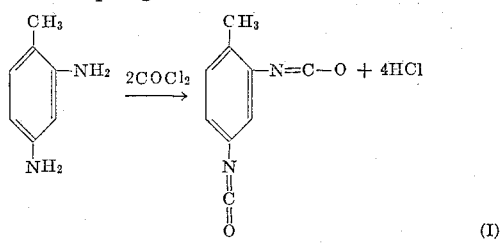

During the phosgenation process, the 2,3- and 3,4-diamino isomers, or vicinal isomers, when present in the reaction mixture do not produce diisocyanates, but benzimidazolinones:

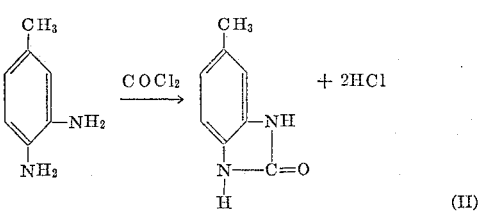

The benzimidazolinones, having active hydrogen, react with the desired diisocyanates produced, as follows:

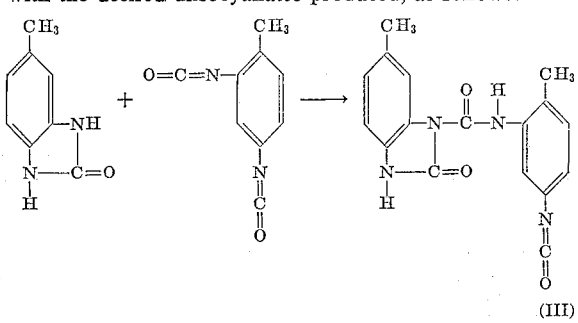

to form Compound III, thereby causing a drop in the yield of diisocyanates. Moreover, since other active hydrogen atoms are still present in Compound III, reaction between further amounts of diisocyanate and Compound III will occur causing further loss of diisocyanates.

The fact that the benzimidazolinone will react with isocyanates is demonstrated by the following laboratory experiment:

5-methylbenzimidazolinone, obtained from the phosgenation of 3,4-diaminotoluene, was heated for 10 hours at 150° C. with an excess of toluene diisocyanate (termed TDI). The mixture was analyzed before heating, after 3 hours, and after 10 hours, for isocyanate content, calculated as toluene diisocyanate, by the dibutylamine method (substantially as described in ASTM D1638–61T). The results obtained were:

| Time: | Percent TDI |
|---|---|
| Start | 90.9 |
| 3 hours | 85.0 |
| 10 hours | 83.6 |

The actual loss is twice the analytical loss because the removal of only one isocyanate group from the diisocyanate with the urea will produce undesirable products.

It is, therefore, not surprising that while a mixture of 2,4- and 2,6-diaminotoluene will yield 98% diisocyanates in laboratory phosgenations, the same mixture containing 3% to 4% vicinal isomers, will yield 87% diisocyanates or less.

While the drop in yield experienced under laboratory conditions is substantial, the presence of vicinal isomers causes additional problems in plant operations and further reductions in actual yield. One troublesome factor in plant operation is the fact that the benzimidazolinones are extremely high melting substances (over 250° C.) and that their reaction products with diisocyanate are tarry substances which physically hold back substantial quantities of diisocyanate. To obtain a fluid distillation residue, suitable for material flow in the plant, it is generally necessary to leave a quantity of diisocyanate with the residue as a solvent which may represent as much as 15 to 20% of the total diisocyanate yield. Costly and relatively low yielding hydrolytic procedures have been used in the past to recover values from these residues in the form of diamines, which are recycled to the phosgenation stage.

The principal object of this invention, therefore, is to remove vicinal arylenediamine isomers from the non-vicinal arylenediamines. This and other objects will become obvious from the following disclosures.

We have discovered that vicinal diamino isomers present in crude mixtures of a substituted or unsubstituted arylenediamine can be separated from the valuable non-vicinal diamines by selectively reacting them with a urea compound and removing a substantially pure non-vicinal diamine product. These urea compounds exclude the imidazolinone compounds mentioned earlier. Diaminotoluene, which is one preferred reactant for the purpose of this invention, will be used to illustrate our novel process.

Diaminotoluene is usually prepared by the catalytic hydrogenation of technical dinitrotoluene, which itself is an isomeric mixture, containing up to 4% vicinal isomers. The hydrogenation product contains the same proportion of diamino isomers as did the dinitro compound. By treating this crude diaminotoluene mixture, taken directly from the hydrogenation step, with a urea at an elevated temperature, the 2,3- and 3,4-diamino isomers will react to form benzimidazolinones. All of the unreacted 2,4- and 2,6-diaminotoluene can then be readily removed from these reaction products by distillation, solvent extraction, or other methods of separation.

While urea and substituted ureas can be used in this process, we may also react the vicinal diaminotoluene isomers with toluene diisocyanate distillation residues. These residues contain, predominantly, urea linkages, as well as isocyanate groups, and a certain portion of toluene diisocyanate itself which had been held back mechanically.

For typical phosgenation procedures, we prefer to use techniques substantially as described in U.S. Patent No. 2,908,703 to Latourette and Johnson, October 13, 1959, wherein the initial contact between the reactants is made at a temperature in the range of about 60–90° C. either on a batch or continuous basis. However, our distillation residues can be obtained by using any other method of phosgenation; this aspect of the invention is by no means limited to specific phosgenation conditions.

Infra-red spectroscopy, molecular weight determinations and other analytical techniques indicate that these residues predominantly contain the following structure:

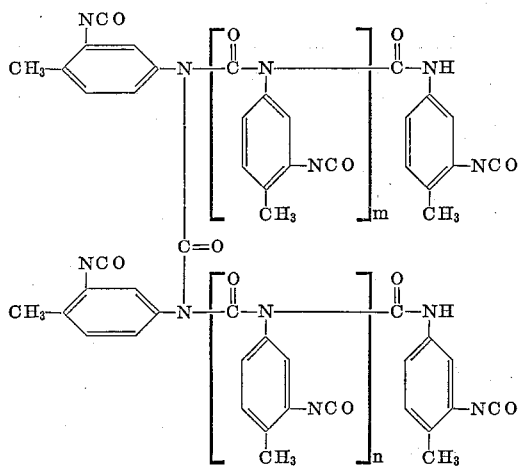

wherein the molecule may have any number of repeating units. The above structure may have originated with the following reaction:

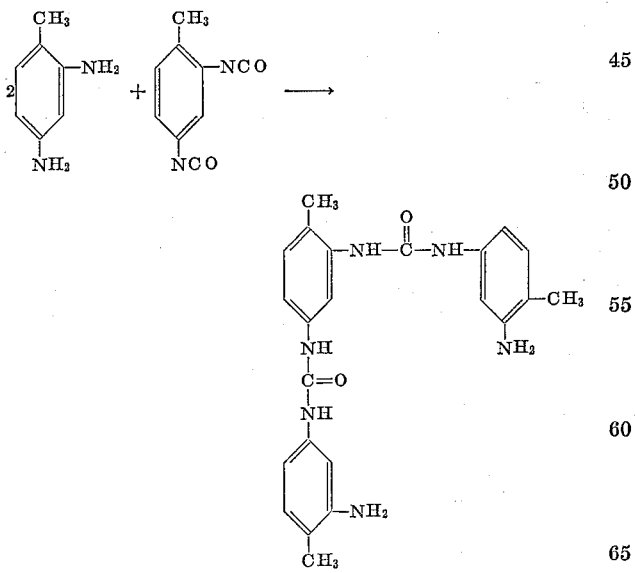

We have further discovered that the non-vicinal diamino-toluene bound up in the complex urea residues can be almost quantitatively recovered. While in the past, the vicinal diamino isomers converted a large portion of the toluene diisocyanate to unrecoverable by-products, by the operation of our invention, substantially all usable diamino and diisocyanate values are recoverable. This can be typified by the following reaction which, for the sake of simplicity, employs the simplest urea based on 2,4-diaminotoluene:

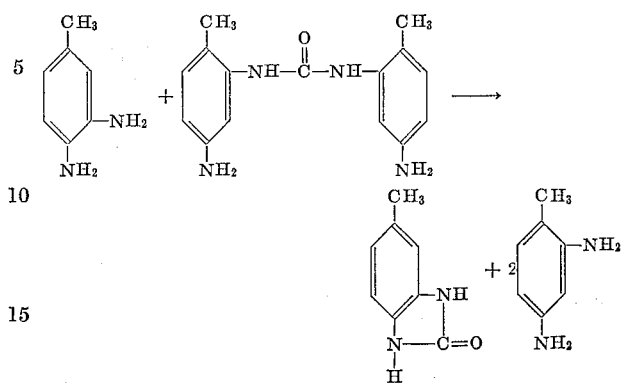

The above reaction illustrates one manner of converting vicinal isomers to by-products which are so difficult to distill that only the non-vicinal diamino isomer can be easily taken off and sent on to the phosgenation stage. The reaction also reveals the important advantage of recovering useful diamino isomers which, in the past, would have been lost.

The presence of isocyanate groups in the complex urea molecule will not adversely affect the preferential reaction with the vicinal diamino isomers. Some toluene diisocyanate product, in fact, may remain in the residue after distillation of the diisocyanate. However, reactions between the isocyanate groups and the amino groups on the non-vicinal isomers will occur. For this reason, it may sometimes be desirable to hydrolyze the isocyanate groups in the urea complex to amino groups, although it is not an essential step in this invention. Hydrolysis may be easily achieved by simply mixing the residue with water; isocyanates hydrolyze with water at ordinary room temperatures. However, better results are obtained in the presence of a solvent, such as benzene and at elevated temperatures.

If desired, the distillation residue may be washed one or more times with an inert organic solvent, such as benzene or hexane, to extract diisocyanate product. The remaining insoluble fraction can then be used in the process. Any residue which is extracted with the diisocyanate may be further washed in another solvent in which it is insoluble. This second fraction may also be used. Thus, all of the residue or any solvent fraction thereof is suitable for use in the process.

Other suitable compounds besides urea and the distillate residues are the alkyl and aryl substituted ureas, urethane and alkyl and aryl substituted urethanes, biurets, and also other compounds containing a

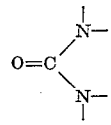

functionality, wherein the functionality is not part of an imidazolinone ring. One or both of the nitrogen atoms of this urea functionality could thus be attached to hydrogen, alkyl, aryl, alicyclic, lower-alkyl substituted aryl, and even other urea-type groups. These substituents may also be long-chained or branched-chain, or even cyclicized polyurea-containing substances having alkyl or isocyanate groups attached thereto.

We have found that excess urea compound need not be added to the crude diamine mixture. After the vicinal diamino isomer has been converted to the cyclic compound, a large excess of urea may then react with the non-vicinal amino isomers. We therefore prefer to add a stoichiometric amount, or only as much of the urea compound as will completely react with the vicinal isomer. Preferably one urea equivalent should be present in the compound per mole of vicinal diamino isomer; a slight excess, however, is permitted to assure complete conversion of the vicinal isomer. Therefore, when urea itself is used, at least one mole of urea per mole of vicinal isomer may be added. If less urea compound than the stoichiometric requirement is added, then naturally some vicinal isomers may not be removed.

When a distillation residue is used as the urea compound, the urea equivalence may be measured by simply adding a nominal amount of it to a sample diamino mixture containing a known amount of vicinal isomer. The mixture is heated to reaction temperature and thereafter analyzed to determine how much of the vicinal isomer remains. The amount that completely converts all of the isomers may then be determined for a given crude diamino mixture.

The reaction of the crude diaminotoluene mixture with the urea should be performed at elevated temperatures. We prefer to operate at about 150°–200° C., for a period of about ¼ to 8 hours.

The following examples are intended to illustrate our novel process but are not limiting thereof.

Example 1

Five hundred grams of a crude diaminotoluene mixture, containing 2.3% by weight of vicinal isomers, as determined by gas phase chromatography, were mixed with 12 grams of urea, at 180° C. for 2 hours. The reaction mixture was vacuum distilled, yielding 457 grams of distilled diamines containing no vicinal isomers.

Five hundred grams of the same crude mixture was merely vacuum distilled, without the intermediate urea treatment. A yield of 460 grams of distillate containing 2.5% vicinal isomers was obtained. This example shows that the vicinal isomers were not separated from the valuable diamines by distillation alone.

Example 2

To 50 grams of the crude diaminotoluene mixture of Example 1 was added 5 grams of a toluene diisocyanate distillation residue having anisocyanate content of 39.7%, obtained after the phosgenation of a crude diaminotoluene isomeric mixture. The treated mixture was stirred for 2 hours at 180° C. At the end of this period, the mixture was analyzed by gas phase chromatography. No vicinal diaminotoluene isomers were present. (The isocyanate content was determined by the dibutylamine method, using hydrochloric acid as the titrant. The method substantially followed ASTM D1638–61T.)

Example 3

Instead of using the toluene diisocyanate distillation residue directly as in Example 2, the residue was first washed in benzene, and 2.5 grams of the benzene-insoluble fraction, containing 18.2% isocyanates was added to 50 grams of the crude diaminotoluene. The mixture was heated for 2 hours at 180° C. Afterwards, the reaction mixture was analyzed by gas phase chromatography. Again, no vicinal isomers remained after this treatment.

Example 4

A distillate residue was obtained after distilling off toluene diisocyanate prepared from the phosgenation of pure 2,4-diaminotoluene. The residue contained 35.0% isocyanate. To 500 grams of crude diaminotoluene, containing 3.8% vicinal isomers, was added 17.5 grams of this residue. When the reaction was distilled, a yield of 440 grams of pure non-vicinal diaminotoluene was recovered.

Example 5

The residue used in Example 4 was treated with benzene, and the benzene-soluble extract was isolated and diluted with hexane. The hexane insolubles were recovered; they contained 22.1% isocyanate. To 500 grams of the crude diaminotoluene of Example 4 was added 17.5 grams of this hexane-insoluble residue fraction. The mixture was heated for 2 hours at 180° C. This reaction mixture was thereafter distilled, yielding 446 grams of diaminotoluene containing 0.1% vicinal diamines.

Example 6

A benzene-soluble extract was recovered from the residue used in Example 4 and refluxed with a 1 N sulfuric acid solution. Two grams of the precipitate which formed was added to 50 grams of the crude diaminotoluene mixture of Example 4, and the mixture was heated for 2 hours at 180° C. The reaction mixture was thereafter distilled yielding diaminotoluene which contained no vicinal isomers.

Example 7

A distillation residue was obtained by distilling crude mixed 2,4- and 2,6-toluene diisocyanate to a pot temperature of 160° C. at 1 mm. To 50 grams of a crude diaminotoluene, containing 3.4% vicinal isomers, was added 2.5 grams of this residue and the mixture was heated for 2 hours at 180° C. At the end of this period, the mixture was distilled. Diaminotoluene distillate contained no vicinal isomers.

Example 8

Another portion of the residue used in Example 7 was heated at 280° C. and 1 mm.; it contained 16.2% isocyanate. To 50 grams of the crude diaminotoluene, containing 3.4% vicinal isomers, was added 2.5 grams of this residue and the mixture was heated for 2 hours at 180° C. The mixture was distilled and the diaminotoluene distillate was analyzed. No vicinal isomers were present in the diamine product.

While this invention describes removal of vicinal isomers of diaminotoluene, it is equally useful for removal of such isomers from phenylenediamine, xylylenediamine, and other substituted and unsubstituted aromatic diamines, in which the presence of vicinal isomers may prove harmful in industrial processes. Moreover, the presence of other substituents on the aromatic nucleus which will not interfere with the reaction, such as alkyl, halogen, and others is considered within the scope of this invention.

Having described our invention, we claim:

1. A process for the preparation of a non-vicinal arylenediamine selected from the group consisting of phenylenediamine, alkyl nuclear-substituted phenylenediamines and halogen nuclear-substituted phenylenediamines which comprises reacting an isomeric mixture containing vicinal and non-vicinal isomers of the arylenediamine with an agent selected from the group consisting of distillation residues obtained from the distillation of crude toluene diisocyanate derived from the phosgenation of toluenediamine, and ureas of the formula

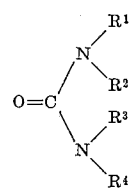

where $R^1$, $R^2$, $R^3$ and $R^4$ are each selected from the group consisting of hydrogen, alkyl, aryl, alicyclic and lower-alkaryl to form benzimidazolinones from the vicinal isomers, and separating the benzimidazolinones from the remaining non-vicinal arylenediamine.

2. The process of claim 1 in which at least one urea equivalent of the agent is reacted with each mole of vicinal arylenediamine.

3. A process for the preparation of non-vicinal toluenediamine which comprises reacting an isomeric mixture containing vicinal and non-vicinal isomers of toluenediamine with at least one mole of urea per mole of vicinal toluenediamine to form a benzimidazolinone from the vicinal isomers, and separating the benzimidazolinone from the remaining non-vicinal toluenediamine.

4. A process for the preparation of non-vicinal toluenediamine which comprises reacting an isomeric mixture containing vicinal and non-vicinal isomers of toluenediamine with at least one urea equivalent of distillation residue obtained from the distillation of crude toluene diisocyanate derived from the phosgenation of toluenediamine per mole of vicinal toluenediamine to form a benzimidazolinone from the vicinal isomers, and separating the benzimidazolinone from the remaining non-vicinal toluenediamine.

References Cited by the Examiner
FOREIGN PATENTS
795,639   5/1958   Great Britain.

OTHER REFERENCES

Hoffmann, The Chemistry of Heterocyclic Compounds (Imidiazoles and Derivatives), Part I, 1953, pages 286–287, Interscience Publishers, Inc., New York.

CHARLES B. PARKER, *Primary Examiner.*

DALE R. MAHANAND, *Assistant Examiner.*